United States Patent
Pagano et al.

(10) Patent No.: US 9,582,958 B2
(45) Date of Patent: Feb. 28, 2017

(54) PROVIDING CINEMATIC ANIMATION AND VISUALIZED PAYOFF IN A ROULETTE GAME

(71) Applicant: Zynga Inc., San Francisco, CA (US)

(72) Inventors: Michael David Pagano, San Francisco, CA (US); Thomas Arthur Shoenhair, Lafayette, CA (US); Ibrahim Nabil Rageh, Pleasant Hill, CA (US); Christopher Mark Karo, San Rafael, CA (US)

(73) Assignee: Zynga Inc., San Francisco, CA (US)

(*) Notice: Subject to any disclaimer, the term of this patent is extended or adjusted under 35 U.S.C. 154(b) by 238 days.

(21) Appl. No.: 14/333,503

(22) Filed: Jul. 16, 2014

(65) Prior Publication Data

US 2016/0019744 A1    Jan. 21, 2016

(51) Int. Cl.
*G07F 17/32* (2006.01)
*G06T 13/20* (2011.01)

(52) U.S. Cl.
CPC ........ *G07F 17/3204* (2013.01); *G07F 17/326* (2013.01); *G07F 17/3286* (2013.01); *A63F 2300/66* (2013.01); *A63F 2300/6661* (2013.01); *A63F 2300/6684* (2013.01); *G06T 13/20* (2013.01)

(58) Field of Classification Search
CPC ............... G06T 13/20; G06T 2210/21; A63F 2300/66; A63F 2300/6661; A63F 2300/6684; G07F 17/3204; G07F 17/326; G07F 17/3286
See application file for complete search history.

(56) References Cited

U.S. PATENT DOCUMENTS

2010/0331070 A1* 12/2010 Bartosik ............. G07F 17/3213
                                                        463/17
2015/0087377 A1*  3/2015 Yee ....................... G07F 17/322
                                                        463/17

OTHER PUBLICATIONS

John Scarne, Scarne's Complete Guide to Gambling, 1961, Simon and Schuster.*

* cited by examiner

*Primary Examiner* — Werner Garner
(74) *Attorney, Agent, or Firm* — Martine Penilla Group, LLP

(57) ABSTRACT

Methods and computer programs for providing animation to online roulette game during game play include providing data for enabling an interface on a device used for playing the online roulette game. The interface renders a grid identifying bet entries and a roulette wheel on which a ball is provided to determine outcome of the roulette game. A number on the grid on which a bet has been placed, is identified. A number is randomly generated to determine outcome of the roulette game. The number corresponds with a specific one of the plurality of slots defined in the roulette wheel in which the ball is to land. Graphical animation is provided at the roulette wheel to provide visual indication of the outcome of the roulette game as the ball is caused to move around the roulette wheel toward the specific slot in the roulette wheel corresponding to the generated number.

16 Claims, 11 Drawing Sheets

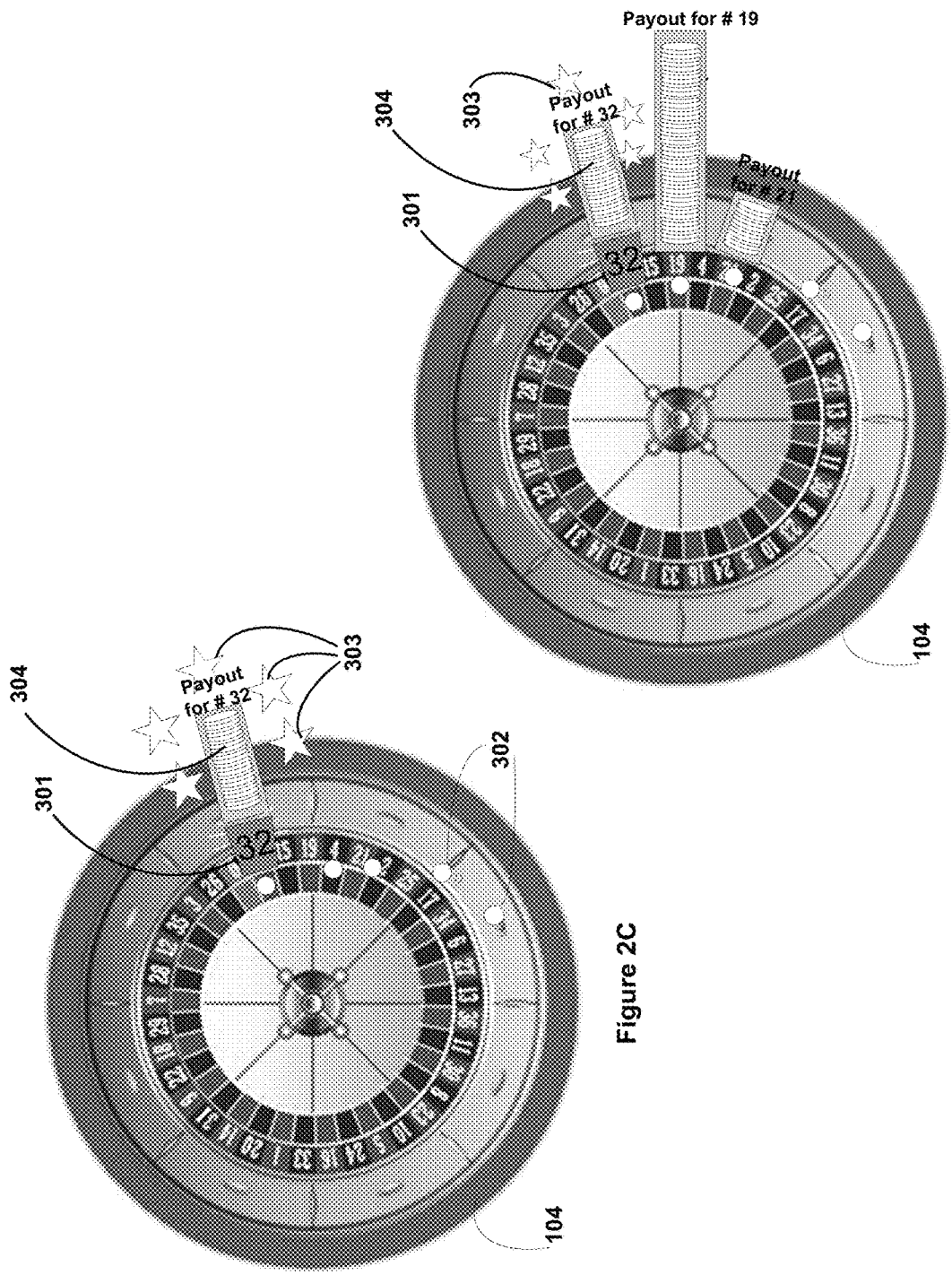

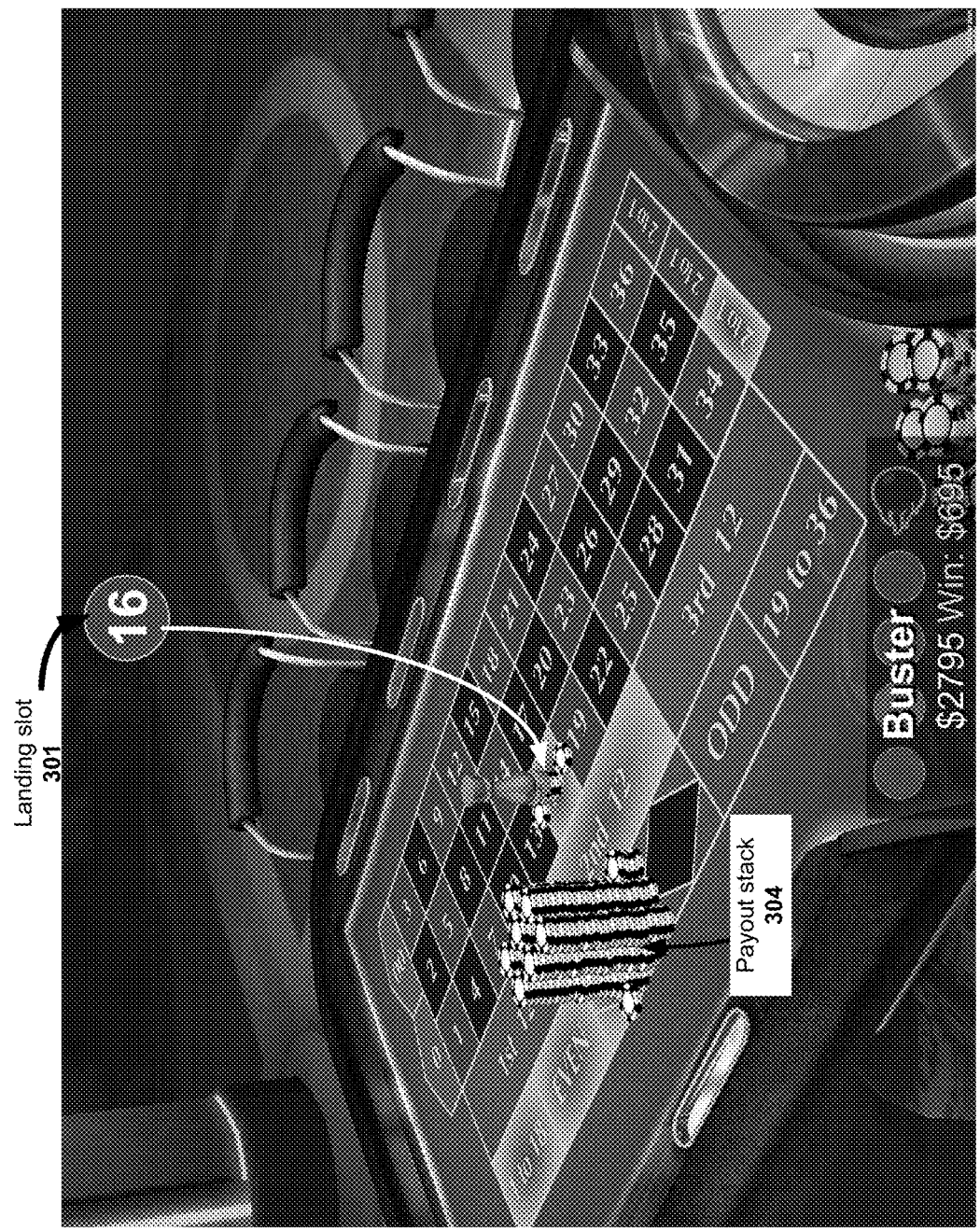

PROVIDING CINEMATIC ANIMATION AND VISUALIZED PAYOFF IN A ROULETTE GAME

BACKGROUND

1. Field of the Invention

The present embodiments relate to methods for providing an online game, and more particularly, methods, systems, and computer programs for providing cinematic animation to an online game.

2. Description of the Related Art

Online betting games have become very popular, including casino-style games, such as video slots, online poker, video poker, roulette, blackjack, etc. In order to attract players and to keep the players engaged for a long period of time, game developers try to provide interesting challenges, and unique variances to challenges within the game to make the game engaging, entertaining, interesting and challenging.

As more games are being developed, game developers are finding ways for keeping the players engaged. In some instances, more options to customize the game field, to personalize the game objects, to adjust the level of the game, etc., have been provided in order to attract and keep the players engaged. Increasing the options available to a player in the game improves players game play experience, which results in longer periods of engagement. Improving customer experience may result in increased betting and longer game play by the players, resulting in greater revenue to the game developers.

Players engaged in game play, especially in betting games, such as online pokers, roulette games, etc., sometime forget what they bet on and how much they bet. With games, such as roulette games, where players can place multiple bets on different numbers, it is hard for the players to keep track of the bet/wager location, the type and amount of bets/wagers placed, and what type of payoff can be expected if they win the bet.

It is in this context that embodiments of the invention arise.

SUMMARY

Methods, devices, systems, and computer programs are presented for providing some level of graphical animation during game play of an online game, such as a roulette game. It should be appreciated that the present embodiments can be implemented in numerous ways, such as a method, an apparatus, a system, a device, or a computer program on a computer readable medium. Several embodiments are described below.

In one embodiment, a method for providing animation for an online roulette game during game play, is disclosed. The method includes providing data for enabling an interface on a device used for playing the online roulette game. The interface renders a grid identifying bet entries and a roulette wheel on which a ball is provided for spinning, during the game play, to arrive at an outcome on the roulette game. The roulette wheel includes a plurality of slots with each of the plurality of slots corresponding to a distinct number defined in the grid. A number on the grid on which a bet has been placed during the game play, is identified. A number is randomly generated to define the outcome for the roulette game. The generated number corresponds to a specific one of the plurality of slots in the roulette wheel in which the ball is to land. Graphical animation is provided at the roulette wheel to provide visual indication of the outcome of the roulette game as the ball is caused to move around the roulette wheel toward the specific one of the plurality of slots in the roulette wheel.

In another embodiment, a method for providing animation to an online roulette game during game play, is disclosed. The game includes providing data for enabling an interface on a device used for playing the online roulette game. The interface renders a grid identifying bet entries and a roulette wheel on which an indicator is provided to determine an outcome on the roulette game. The roulette wheel includes a plurality of slots with each of the plurality of slots corresponding to a distinct number defined in the grid. A number is generated randomly to define the outcome for the roulette game. The generated number corresponds to a specific number in the grid and identifies a specific one of the plurality of slots in the roulette wheel in which the indicator is to stop. Graphical animation is provided at the roulette wheel to visually present the outcome of the roulette game. The graphical animation includes providing visual indication of payout computed for each of the plurality of slots in the roulette wheel as the indicator passes around or toward the respective one of the plurality of slots.

In yet another embodiment, a non-transitory computer-readable storage medium storing a computer program for providing animation for an online roulette game during game play, is disclosed. The computer-readable storage medium includes program instructions for providing data for enabling an interface on a device used for playing an online roulette game, wherein the interface renders a grid identifying bet entries and a roulette wheel on which a ball is provided for spinning, during the game play, to arrive at an outcome on the roulette game; program instructions for identifying a number on the grid on which a bet has been placed during the game play; program instructions for randomly generating a number to define the outcome for the roulette game, the generated number corresponds to a specific number in the roulette wheel in which the ball is to land; and program instructions for providing graphical animation at the roulette wheel to provide visual indication of the outcome of the roulette game as the ball is caused to move around the roulette wheel toward the specific one of the plurality of slots in the roulette wheel.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 2B through 2H illustrate a roulette wheel exhibiting different types of graphical animation provided at one or more numbers on the roulette wheel as the spinning ball approaches the number on the roulette wheel, according to one embodiment.

DETAILED DESCRIPTION

Figure 1:
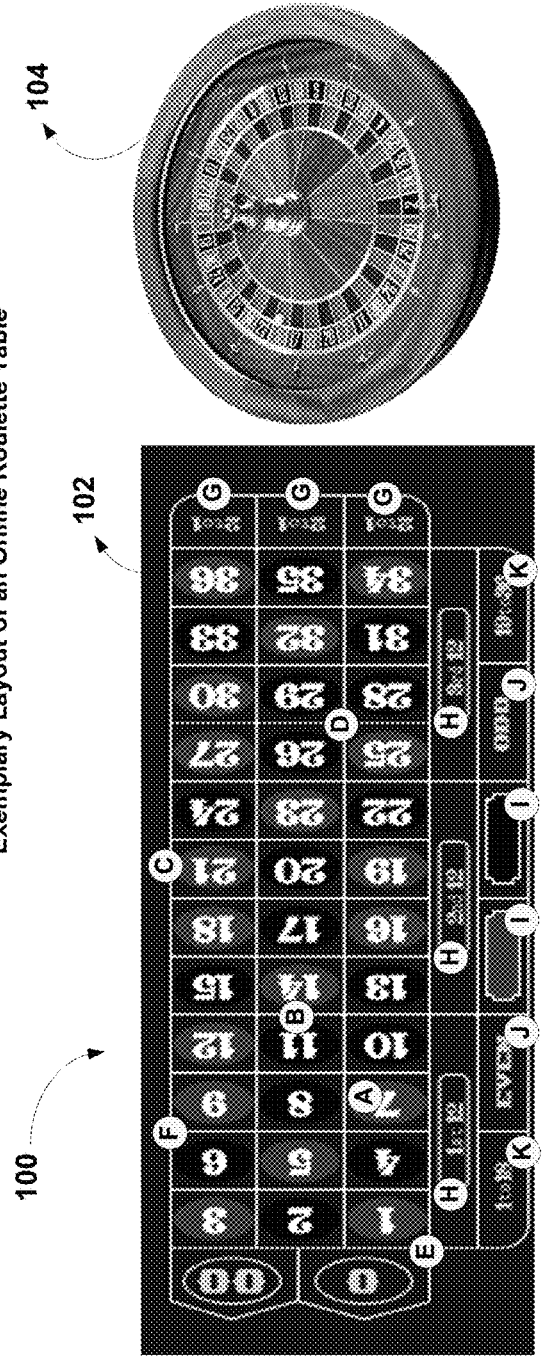
FIG. 1 depicts an interface for playing a video roulette game, according to one embodiment.

The following embodiments describe methods, devices, systems, and computer programs for providing graphical animation for an online roulette game during game play. It will be apparent, that the present embodiments may be practiced without some or all of these specific details. In other instances, well-known process operations have not been described in detail in order not to unnecessarily obscure the present embodiments.

Various embodiments describe different types of animation that can be provided to an online roulette game during game play. Data for enabling an interface on a device (i.e., a client device) that is used for playing the online roulette game, is provided. The user interface is used to render a grid of bet entries for a roulette game and a roulette wheel on which a ball is provided for spinning to determine outcome of the roulette game. The bet entries identify distribution of different numbers of the roulette game and various types of betting options available during game play. One or more bets placed by the user during game play are identified. A number is generated randomly to define the outcome of the roulette game. The generated number corresponds to a number on the roulette wheel where the ball is to land, for that spin. The ball is caused to spin around the roulette game. When the ball approaches the generated number in the roulette wheel that corresponds to the generated number where the ball is to land, graphical animations are presented at the roulette wheel. These graphical animations alert a player of the wins for the game and the payout computed for the winning number based on the amount and type of bet placed on the winning number. The graphical animations may be provided in any one or combination of audio, visual, video, or other graphical forms to inform the players of the wins. Additionally, the graphic animations may also alert the players of the payout for the generated number as the ball approaches the number in the roulette wheel. The payout information may also be provided at numbers other than the generated number to alert the players of the potential payout so as to influence the players to play and place the bets on the numbers to maximize their wins. The system keeps track of the various numbers on which the player has placed his wager/bet and provides the graphic animation to inform the player of which number provided the win and how much payout was computed for each number, including the winning number for each game. In some embodiments, in addition to the payout information for each number, the system may also provide the various numbers the player has played in the game and the near miss in the payout for the placed wagers. The payout information on the numbers that the player has placed frequently that is near misses may be presented in a matrix format for easy review. The near misses may be on bet entries that were placed by the player during previous game plays within a given session or for the game as a whole and the information presented in the matrix format will reflect the details of the near miss payouts of the session or the game as a whole. Such information would help the players to plan their subsequent game plays so as to optimize their returns on wagers/bets. Conventional online roulette games do not provide such detailed information to the players to allow them to make informed decisions on which numbers to wager and how much to wager to have optimal winnings and game play experience.

FIG. 1 depicts a user interface that is provided with data for playing an online roulette game, according to one embodiment. When a user accesses the roulette game from his/her client device, the user interface 100 is presented. The data provided for the user interface includes a grid 102 of the roulette game. The grid identifies distribution of numbers associated with the roulette game and the various different types of bets/wagers that can be placed during game play. As illustrated in FIG. 1, the various types of bets are identified by reference letters, "A" through "K". Each of the bets/wagers is associated with a payout. FIG. 1 illustrates the payouts for each dollar/currency of wager/bet placed for different types of bets placed on the grid. For example, a straight bet is one in which a player places his/her wager on a single number (e.g., number 7, in the example illustrated in FIG. 1) on the grid. The payout for the single bet is 35:1. In other words, for every dollar wagered, a player may get back $35.00 in return, if the number 7 wins. In addition to the grid 102, the user interface renders a roulette wheel 104 for determining outcome of the roulette game. The roulette wheel includes a plurality of slots, with each of the plurality of slots associated with a number that corresponds to a number defined in the grid. A ball is provided at the roulette wheel for spinning, during the game play, to determine outcome of the roulette game. The roulette wheel using the ball is one exemplary tool for determining the outcome of the game and that other forms of roulette wheels, such as free spinning roulette wheel with an indicator, or any other form/tool for determining the outcome of the game, may be employed.

A roulette game application executing on a server provides data for the user interface as well as the graphical animation during game play. The game application may include one or more modules that keep track of the bets/wagers placed in the grid by the player, generate a number randomly to define the outcome of the roulette game, and provide graphical animation to provide visual indication of the outcome of the roulette game as the ball is caused to move around the roulette wheel toward a specific one of the slots defined in the roulette wheel that corresponds to the generated number. In some embodiments, the animation may be provided when the generated number matches the number on which the player has placed his bet. The game application, in one embodiment, may include a wager detector module, an input detector module, a random number generator module and an animation provider module. When a user accesses the roulette game, the user input at the client device may be used to send a request to the server and the server may return the data for enabling a user interface of the roulette game to be rendered on the display portion of the client device, in response to the request. The user interface (UI) renders a grid identifying a plurality of numbers and various types of bets that can be placed by a player during a game play. The UI also renders a roulette wheel on which a ball is provided for spinning to determine outcome of the game. The UI may include an option, which when selected, would cause the ball to spin around the roulette wheel toward a number that is generated randomly during game play. For example, the option may be a "spin" option in the form of a button. The aforementioned option and format are exemplary and should not be considered restrictive. Other options in varying formats may be provided to cause the ball to spin around the roulette wheel.

User input is detected at the user interface on the client device. The user input may be in the form of selection of one or more numbers in the grid of the roulette game (102 of FIG. 1) and placement of bets/wagers at each of the identified numbers. A user may place varying amount of bets/wagers on each of the identified numbers on the grid. In response to the user input at the grid, the wager detector module is configured to detect the user input, identify the selection of the numbers and the amount of wager placed at each number. Information from the wager detector module is shared with the animation provider module.

In response to the user input on the grid of the user interface, the input detector module may randomly generate a number corresponding to one of the numbers in the grid of the roulette game. A random number generator module may be employed by the input detector module to randomly generate the number. The generated number identifies a specific one of the plurality of slots in the roulette wheel where the ball is to land during game play. The randomly generated number is provided as input to the animation provider module.

The animation provider analyzes the information provided by the wager detector module to determine the number(s) in the grid where the user has placed his wager and uses randomly generated number provided by the input detector module to provide graphical animation at the roulette wheel. In one embodiment, the graphical animation provided at the roulette wheel may cause the ball to spin around the roulette wheel toward a specific one of the plurality of slots defined by the generated number. As the ball spins around the roulette wheel, additional graphical animation may be provided as the ball lands in the specific slot defined by the generated number. The animation may be to inform the user of the winning number for the particular game play. If the generated number matches a number on which the player has placed his/her bet/wager, the animation provider module is configured to provide additional graphical animation at the specific slot. In one embodiment, the animation provider module may slow the motion of the ball at the roulette wheel as the ball approaches the specific slot corresponding to the generated number. In addition to slowing the ball, the animation provider may highlight the number associated with the specific slot in the roulette wheel. When the generated number matches a number on which the bet has been placed, the animation provider may provide animations (for e.g., stars, balloons, confetti, etc.) around the number, etc. In addition to the visual graphical animations, the animation provider may provide audio (for e.g., ringing of bells, applause, etc.), video or other forms of animation. The additional animation provided by the animation provider may include presenting an expected payout for the specific slot at the roulette wheel. The expected payout may be computed based on the amount of wager and type of wager placed by the player at the number in the grid. In one embodiment, the expected payout may be provided in the form of transparent stack of chips, wherein the number of chips in the stack corresponds to the payout. FIGS. 2A-2H illustrate the different screen renditions of the roulette wheel on which the graphical animations are provided during game play, to depict the outcome of the game.

Figure 2B:
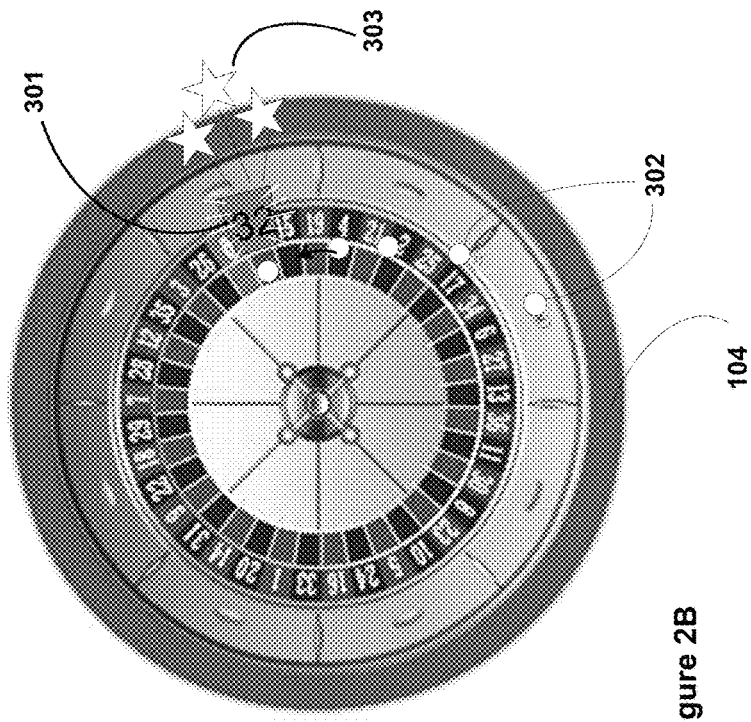
Figure 2A:
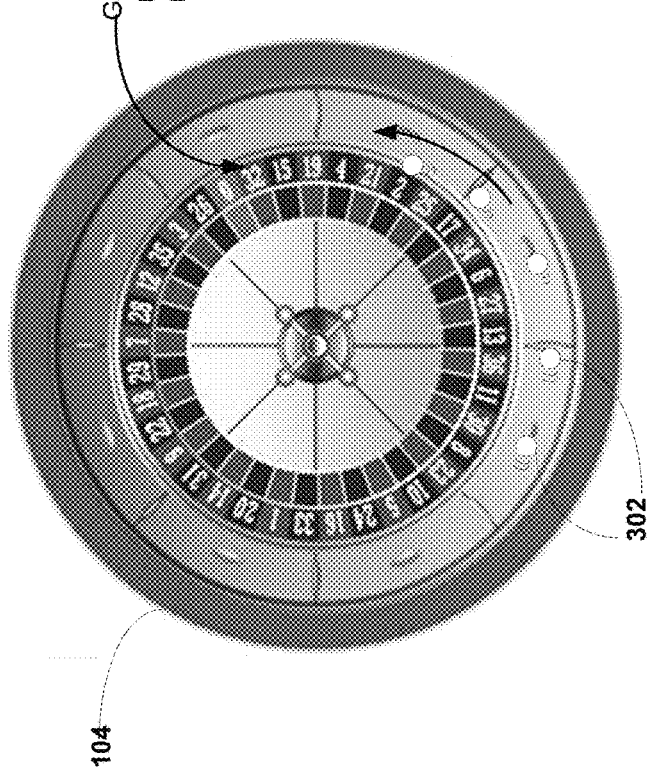
FIG. 2A illustrates an exemplary rendition of a roulette wheel with a ball spinning in response to receiving user input at the roulette game, according to one embodiment.

FIG. 2A illustrates a rendition of a roulette wheel with a ball provided for determining outcome of the game, in one embodiment. A player may place his/her wagers/bets on different bet entries that identify a number, combination of numbers or other locations in the grid (described in FIG. 1), as part of game play. After the player has placed his wagers, a random number is generated to determine the outcome of the game play and graphical animation is presented at the roulette wheel to provide visual indication of the outcome of the game play of the roulette game. The generated number corresponds to a number on the roulette wheel where the ball is to land (i.e., landing slot). For example, as illustrated in FIG. 2A, the randomly generated number is 32 (as shown by reference numeral 301). In one embodiment, the graphical animation causes the ball to spin around the roulette wheel toward a specific slot defined by the generated number. As the ball follows the path 302 and approaches the specific slot, the animation graphics provided at the roulette wheel causes the ball to slow down. In another embodiment, in addition to causing the ball to spin, the roulette wheel is also caused to spin around in a direction opposite to the direction of the ball spin. In this embodiment, as the ball approaches the specific slot, the animation includes slowing of the ball and the roulette wheel.

Referring simultaneously to FIGS. 2A, 2B and 2C, in order to provide the slow motion animation, the animation provider, in one embodiment, causes the ball to spin around the roulette wheel, tracks the movement of the ball as the ball follows the path 302 and makes its way around the roulette wheel 104, determines the slot that the ball is passing, determines the distance of the ball from the specific slot where the ball is to land, and provides the necessary animation that causes dynamic reduction in the motion of the ball as the ball gets closer to the specific slot. In some embodiments, the animation provider may rely on a threshold distance (for e.g., 6 slots or 8 slots) from the landing slot, to provide the animation of reduced speed for the ball and animation of actual landing of the ball in the landing slot. In one embodiment, as the ball lands in the slot associated with the generated number (for e.g., number 32, as shown in FIGS. 2A-2C), the animation provider renders other graphical animation at the roulette wheel. In one embodiment, the graphical animation may be in the form of presenting an enlarged view of the generated number (identified by reference numeral 301) at the roulette wheel that corresponds with the number associated with the landing slot. Alternately or additionally, other animations, such as highlighting the number associated with the slot, rendering the number over the roulette wheel, providing flying stars 303, halo, confetti, etc., may also be provided over, on or for the number associated with the slot, as illustrated in FIGS. 2B, 2F-2H.

FIG. 2C illustrates a form of graphical animation that may be provided at the specific slot defined by the generated number when the generated number matches the number on which the user/player has placed a bet, in one embodiment. In this embodiment, the animation provider may provide graphic animations in the form of potential payouts 304 at the landing slot of the roulette wheel. The payout information may be provided in the form of transparent stack of chips representing the win in the game. The number of chips in the transparent stack may, in one embodiment, correspond to the computed win in the game. The payout information allows the user to visualize the win and plan his/her wager/bet strategy for subsequent game play accordingly. The payout information 304 may be in addition to the other graphic animations (such as slow motion of the ball along path 302, slow motion of the roulette wheel, flying stars/confetti 303, highlights, etc.,) that are rendered at the appropriate location in the roulette wheel. In an alternate embodiment, only the payout information may be provided in place of the other graphic animations.

In one embodiment, the payout information is not only presented for the landing slot but can be provided for other slots as the ball passes the respective slots on its way to the landing slot. For example, when the landing slot is 32 and the ball passes slots 2, 21, 4, 19 and 15 before proceeding to land in the landing slot 32, the animation provider may identify the passing slots, compute the potential payouts for each of the slots and provide the payout information for the different slots as the ball moves through these slots. In one embodiment, the animation provider may determine the amount of bet placed on a particular grid entry and use the bet amount from the grid entry to determine potential payouts for the different numbers in the roulette wheel corresponding to the bet amount as the ball moves around the roulette game. The animation provider then presents the potential payouts for each of the numbers at the roulette wheel as the ball passes these numbers toward the landing slot. FIG. 2D illustrates one such embodiment. As illustrated, exemplary payout information for slots 21 and 19 are presented in addition to the landing slot as the ball passes each of these slots toward the landing slot. The embodiment illustrated in FIG. 2D shows the payout information for only two other slots in addition to the landing slot, in order to provide a non-crowded view. In reality, it should be noted that the payout information of all the slots on which a bet has been placed and/or through which the ball passes through to reach the landing slot, may also be rendered.

Figure 2E:
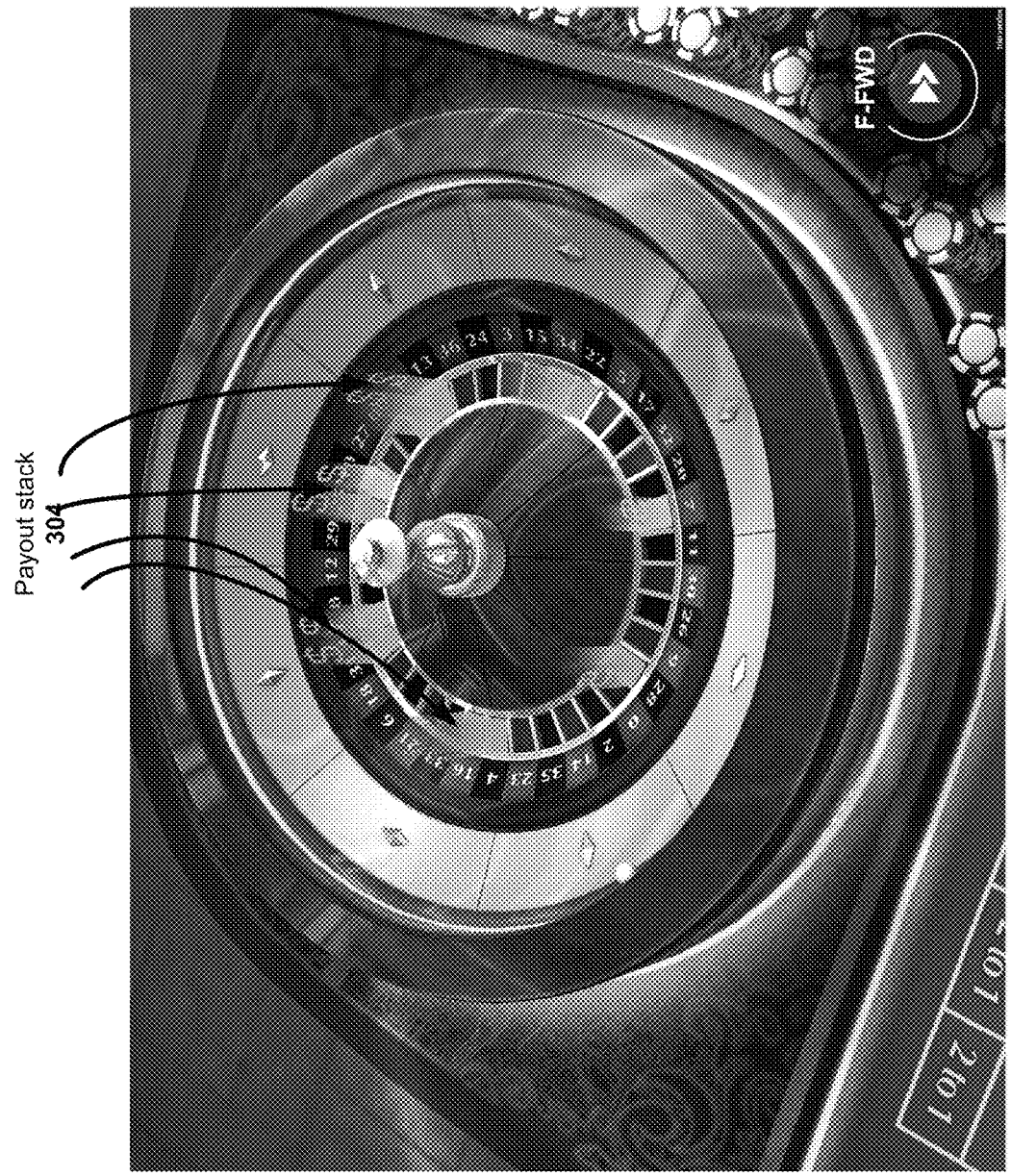

FIG. 2E illustrates one such embodiment of the roulette wheel where the slots that have potential payouts are identified and rendered as payout stacks 304 using the animation provider. As shown, each of the slots corresponding to numbers 16, 4, 28, 7 (matches a generated number, in this embodiment), 22, 34, 15, 13, 1, 10, 25, 19 and 31 have highlighted stack 304 associated with them, indicating potential payout in each of these numbers. In the embodiment illustrated in FIG. 2E, the height of the highlighted stack 304 at each number corresponds to the magnitude of payout for that number with the tallest highlighted stack having the highest payout and the shortest stack having the least payout. In some embodiments, instead of the height, different colored highlight stack may also be used to indicate the potential payout. In the embodiment illustrated in FIG. 2E the actual payout amount has not been provided. In some embodiments, the actual payout amount in appropriate currency, may be computed and provided alongside, or at the highlighted portion or instead of the highlighted portion of the respective slots. The payout information may be provided as transparent stack of chips (as illustrated in FIG. 2D), in textual format (not shown) within the highlighted portion. The rendering of the payout information is not restricted to the aforementioned formats but can also include other formats.

In one embodiment, the animation provider may perform additional analysis of the payouts before presenting the payout at the roulette wheel. In this embodiment, for example, the animation provider may determine the payout defined for the landing slot, identify the slots that the ball is passing through before landing in the landing slot, determine the payout for each of these slots and when the payout for particular slot(s) is larger than the payout of the landing slot, present the payout for those particular slot(s) as the ball passes through the particular slots. In this embodiment, the animation provider allows the player to visualize which slots have greater payout than the landing slot to assist the user in determining where to place the bet for optimal return. As the roulette games are fast paced, it will be advantageous to provide users with as much information as possible so that the users will be able to make accurate bets quickly for maximum/optimum payout.

Figure 2F:
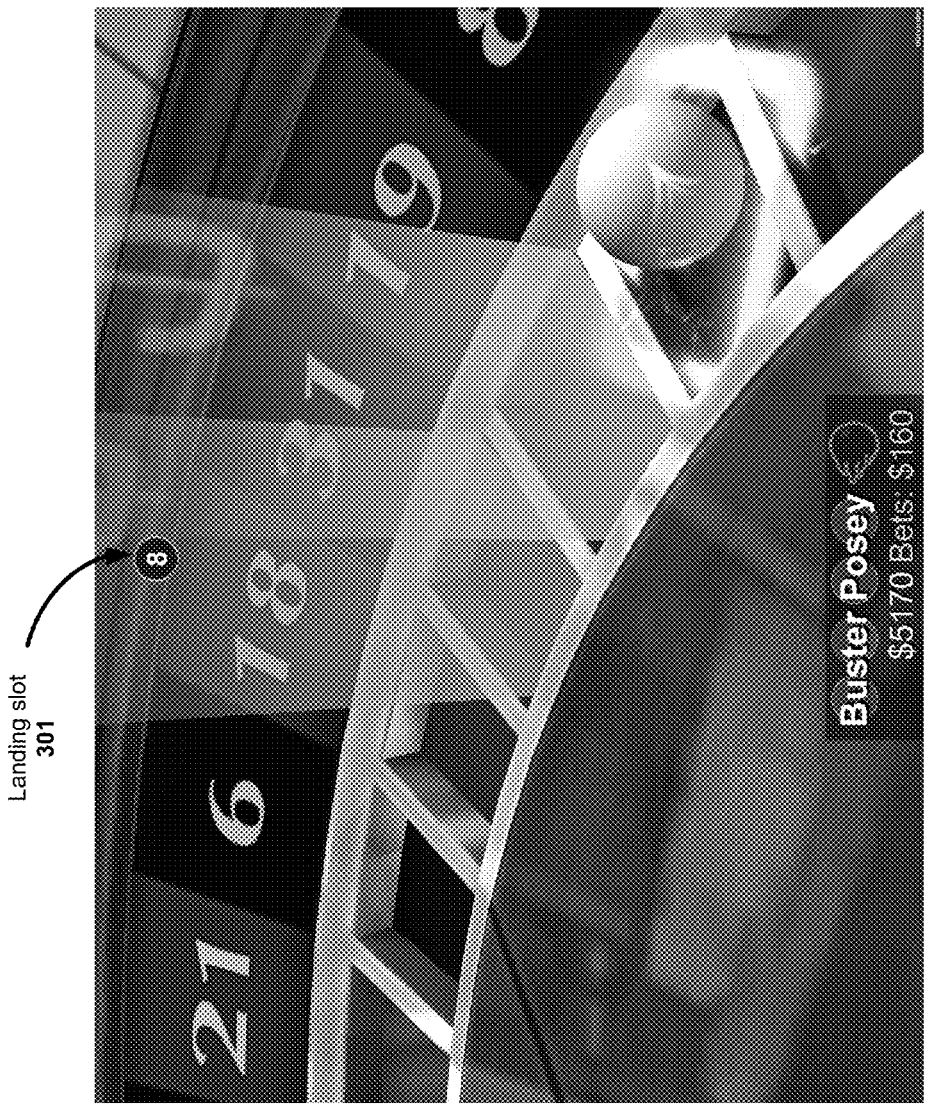

In yet another embodiment, the animation provider may identify the slots that were passed as the ball moved toward the landing slot and provide an informative message to inform the user of the near miss in the potential payouts. For example, as illustrated in FIG. 2F, the graphical animation may include close-up view of the slot in which the ball lands. In addition to the zooming in, one or more of the nearby slots that had huge payouts may also be highlighted and rendered on the user interface of the device, to inform the user of the near misses. Information related to the near miss may be presented when the slots of numbers associated with the near miss are proximate to the landing slot. Thus, as shown in FIG. 2F, the landing slot corresponding to the generated number (number 8) is shown along with near-miss slots 19 and 31 that are proximate to the landing slot highlighted to indicate the potential payouts. In one embodiment, the landing slot is highlighted to indicate a net loss for a player that has bet on the number associated with the landing slot. The bottom of the screen of FIG. 2F illustrates the total amount that a player had and the amount that the player bet and lost based on the near miss of the bet entry 8.

Figure 2G:
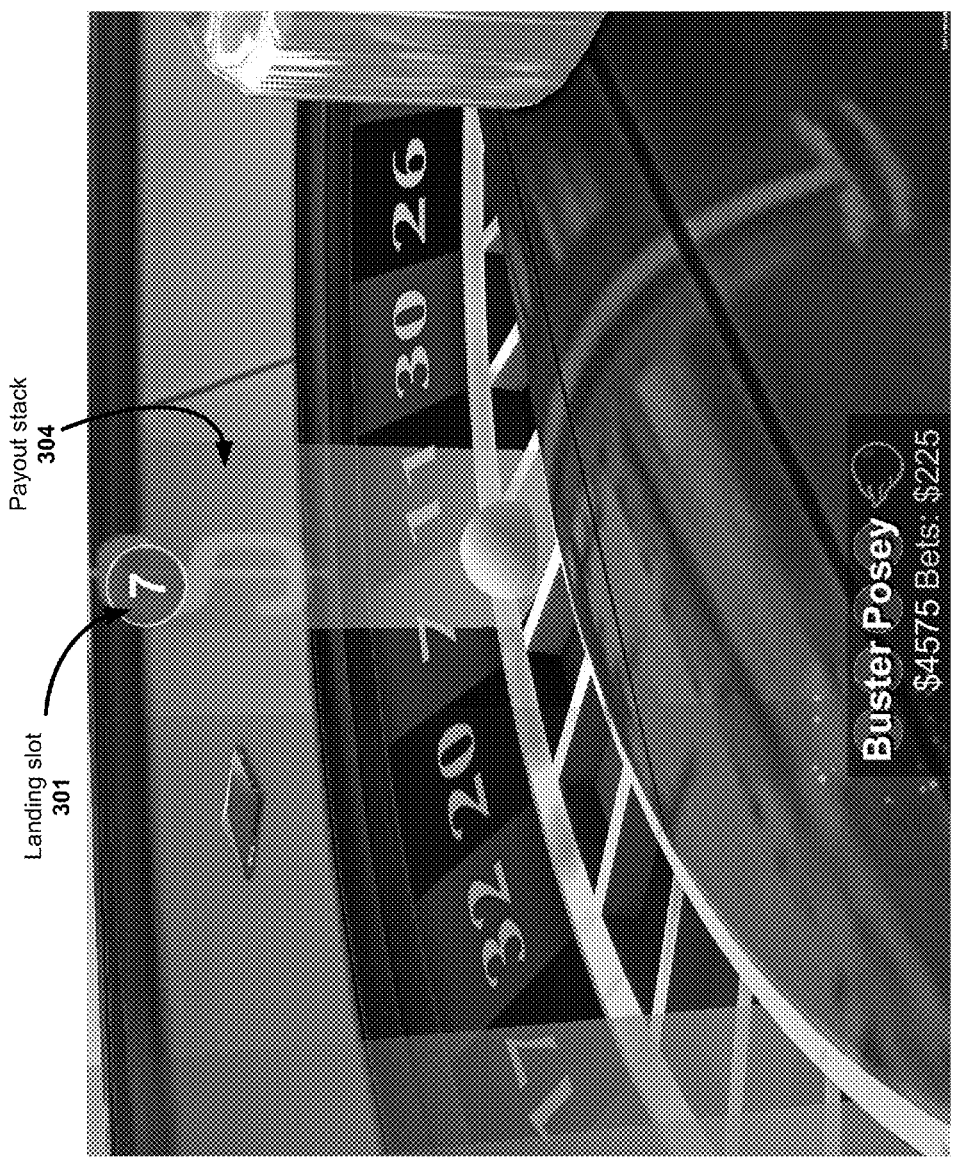

FIG. 2G illustrates the screen shot of the virtualized payout for the winning slot corresponding to slot number 7 (identified by reference numeral 301) in which the ball lands. As shown, the payout stack rendered at the landing slot indicates the win and the bottom portion of the screen of FIG. 2G illustrates the total amount of bet that the player bet on the bet entry relating to the landing slot 7 that provided the win.

FIG. 2H illustrates an embodiment that shows the payout stack 304 on the betting entry on the grid of a player. The animation provider computes the payout for the player based on the bet entry selected and presents the winning payout stack at the winning number on the grid. Thus, as can be seen from FIG. 2H, the winning payout stack is presented at the winning number 16 and the payout stack corresponds to a straight bet placed by the player on the grid. The bottom portion of the screen also highlights the computed amount of payout for the landing slot.

In some embodiments, in addition to rendering payout(s) for slots related to the near misses, other information related to the near misses may also be identified and presented to the user. The information may be provided in matrix format with the different numbers that the user had bet on, the numbers that were near misses to the numbers the user bet on, and the potential payouts for the near miss numbers. The information matrix, in one embodiment, may include only the most common numbers chosen by the user during prior game plays and the near misses for the identified numbers. User may use the information presented in the matrix to strategize his/her future game play so as to receive optimum payouts.

In one embodiment, the payout presented by the animation provider at the landing slot or any other slots may depend on the type of bet (for e.g., straight bets, split bets, street bets, etc., as illustrated in FIG. 1) placed by the user (i.e., player) in the grid. As each type of bet provides a different payout, the animation provider keeps track of the amount and type of bet placed by the user on different numbers in the grid and determines the payout for each slot accordingly. For example, if the user placed a split bet on number 32 that is associated with the landing slot, then the animation provider presents the payout that corresponds to return associated with the split bet. In this case, the payout would be 17:1 and the transparent stack of chips will reflect this payout when rendered in the roulette wheel. In another embodiment, the payout presented by the animation provider at different numbers that appear before and are proximate to the number associated with the landing slot may correspond to the split bet and the maximum payout computed and rendered for the proximate numbers will reflect the bet entry selected by the user. The payout information may be useful to the player for game play strategy.

In one embodiment, in addition to providing visual animation, the animation provider may provide audio animation at the roulette wheel during game play. For example, as the ball is caused to move around the roulette wheel toward the landing slot determined by the randomly generated number, sound effects may be presented to inform the user of the outcome of the game play. The sound effects may increase in intensity from a minimal setting as the ball spins around the roulette wheel to a maximum setting as the ball lands in the landing slot or different types of sounds may be presented to the user as the ball moves around the roulette wheel before the ball lands in the landing slot. Additional sound effects may be presented as the ball passes through each of the slots on which a bet has been placed. In addition to audio and visual animations, haptic animation or any other form of animation may also be presented at the different slots during game play to inform the player of the outcome of the game play.

Figure 3:
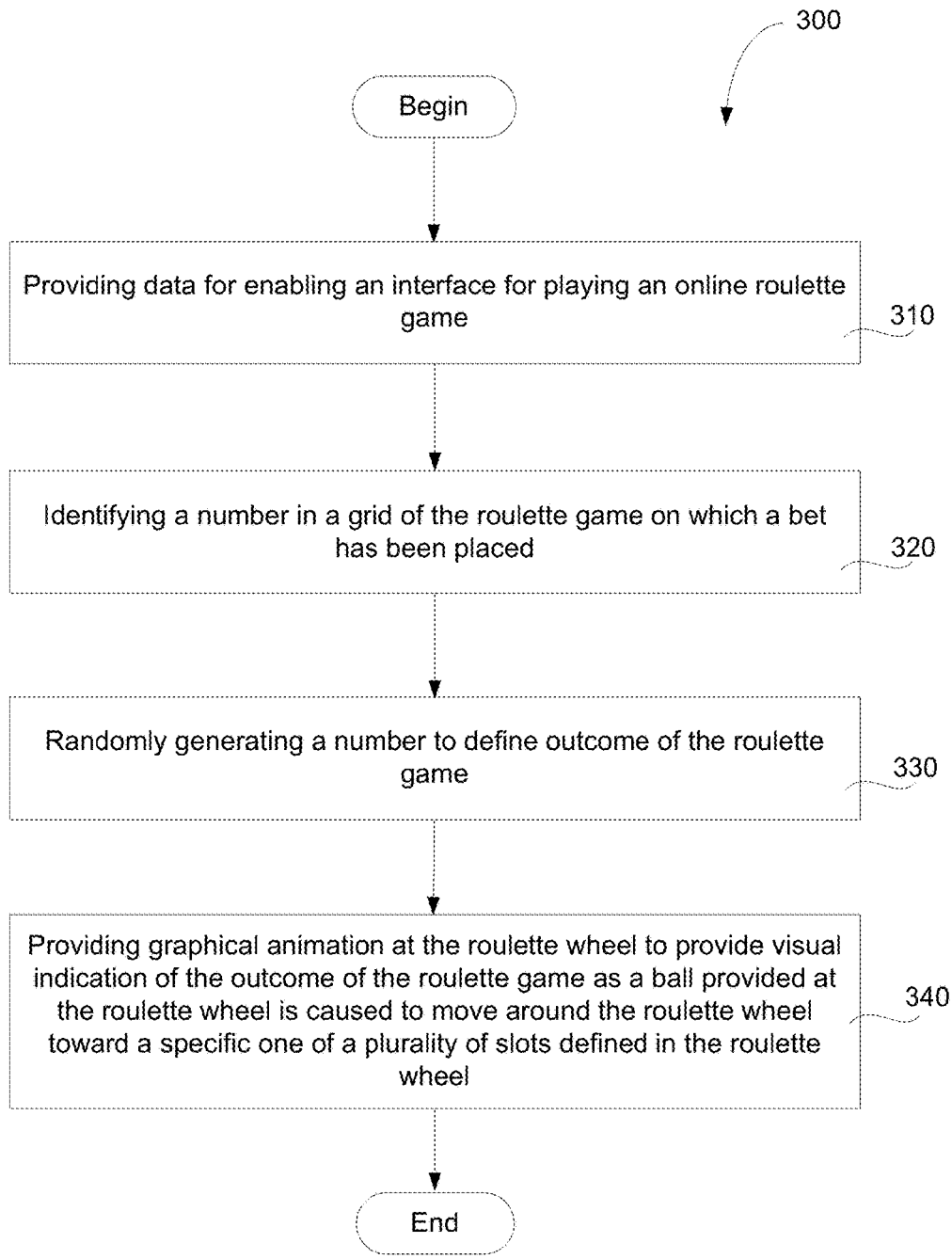
FIG. 3 is a flowchart illustrating an algorithm for providing animation for an online roulette game, according to one embodiment.

With the above detailed description of the various embodiments, methods for providing graphical animation at the roulette wheel of an online roulette game during game play, will now be described with reference to FIGS. 3 and 4. Referring to FIG. 3, the method for providing graphic animation 300 begins at operation 310, wherein data for enabling a user interface is provided on a device, such as a client device, used for playing an online roulette game. The user interface may be provided at the client device in response to the user accessing the online roulette game from a game "lobby", wherein the game lobby may identify a plurality of games that are available to the user of the client device, based on the user's subscription/account. In response to the user selection in the game lobby, a request may be forwarded to a server and the server, in response to the request, may forward the data for enabling the user interface at the client device. The data returned by the server is used to present a grid that identifies various bet entries and a roulette wheel on which a ball is provided for spinning, during the game play, to determine outcome of the roulette game. Each of the bet entries corresponds to one or more numbers in the grid. The roulette wheel identifies a plurality of slots, with each slot corresponding to a number defined in the grid.

A number in the grid on which a bet has been placed by the user, is identified, as illustrated in operation 320. The roulette game application may track the user input in the grid and detect a number on which the user has placed his/her bet. As illustrated in FIG. 1, the user may place a bet on one number or a combination of numbers on the grid. The roulette game application may determine the type of bet that has been placed based on the bet entry selected by the user.

After the bet has been placed, a number is generated randomly to define the outcome of the roulette game, as illustrated in operation 330. The generated number identifies a specific one of the plurality of slots in the roulette wheel in which the ball is to land.

Graphical animation is provided at the roulette wheel to provide visual indication of the outcome of the roulette game. The graphical animation may be provided to cause the ball to move/spin around the roulette wheel toward a specific one of the plurality of slots defined by the generated number, as illustrated in operation 340. In one embodiment, in addition to causing the ball to spin around the roulette wheel, the graphical animation may cause the roulette wheel to spin in a direction opposite to the direction of the spinning ball. The graphical animation may also include providing an animation of the slowing of the ball as the ball approaches the specific slot associated with the generated number. Additional animation, such as potential payouts, audio feedback, etc., may be provided at the different slots in the roulette wheel during game play, as the ball moves around the roulette wheel. The game application provides an interesting animation to inform the user of the state of the user's bet(s), the game outcome and the potential payout on other bet entries/near misses.

Figure 4:
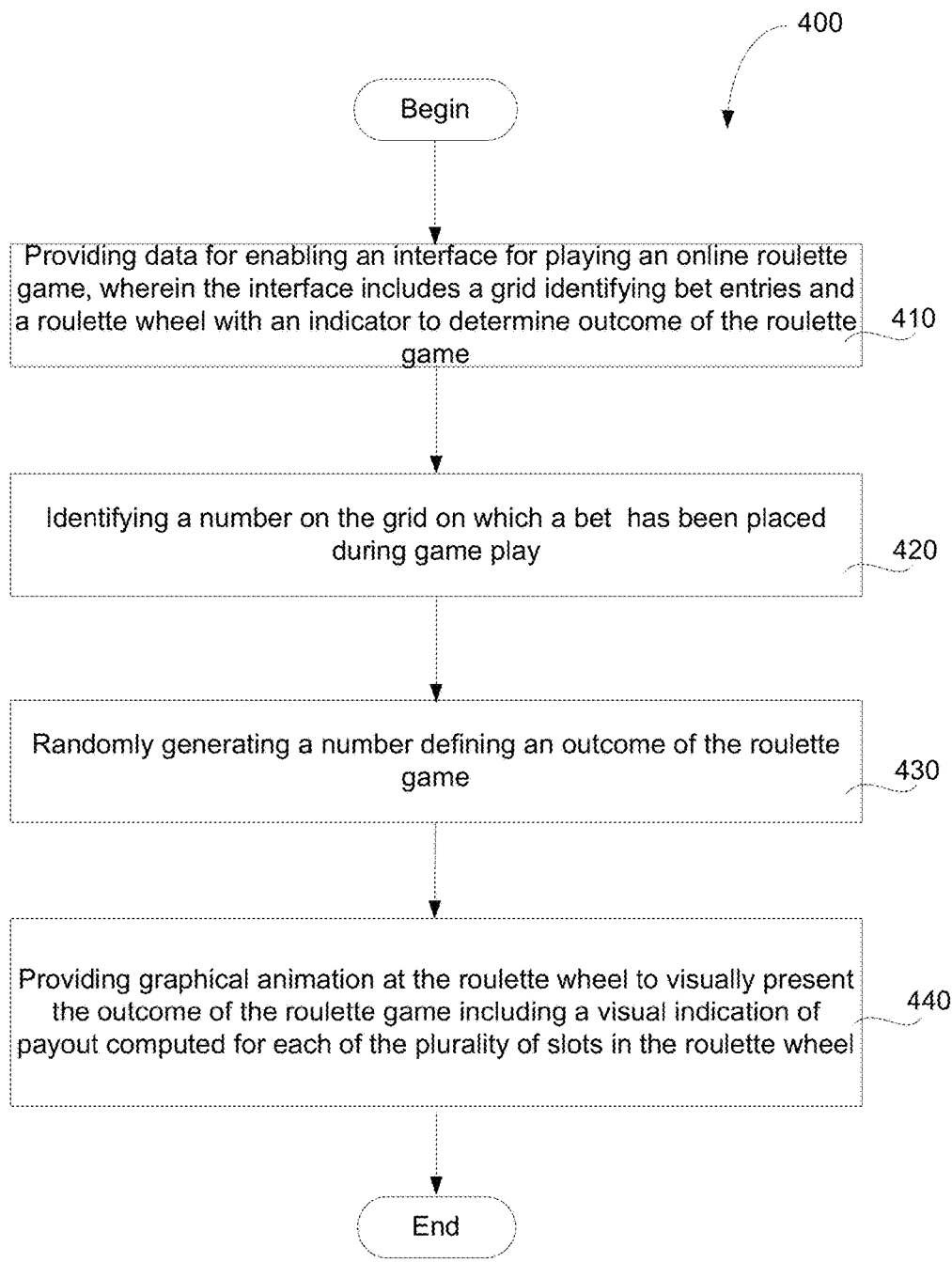
FIG. 4 is a flowchart illustrating an algorithm for providing animation for an online roulette game, according to an alternate embodiment.

FIG. 4 illustrates method operations for providing graphic animation 400 for a roulette game, in accordance to an alternate embodiment of the invention. The method begins at operation 410, wherein data for enabling a user interface on a device used for playing an online roulette game, is provided. The data for the user interface is provided by a server, in response to a game access request received from the device (i.e., client device). The user interface renders a grid identifying bet entries, and a roulette wheel on which an indicator is provided to determine an outcome of the roulette game. The grid identifies a plurality of numbers and the bet entries identify the type of bet that can be placed for each of the plurality of numbers, as identified in FIG. 1. The roulette wheel includes a plurality of slots with each slot corresponding to a distinct number in the grid.

A number in the grid on which a bet has been placed, is identified, as illustrated in operation 420. User interaction at the grid may be tracked to determine the amount of bet and type of bet placed by a player based on the bet entry selected.

A number is generated randomly to define the outcome for the roulette game, as illustrated in operation 430. The number may be generated in the background using a random number generator. The generated number corresponds to a number in the roulette wheel and identifies a specific one of the plurality of slots at which the indicator is to stop, during game play.

In response to the generated number, graphical animation is provided at the roulette wheel to visually present the outcome of the roulette game. The graphical animation includes causing the roulette wheel to spin around toward the specific one of the plurality of slots defined by the generated number where the indicator is to stop and visual indication of potential payout computed for each of the plurality of slots in the roulette wheel as the roulette wheel passes the respective slots toward the specific slot where the indicator is to stop, as illustrated in operation 440. Additional graphical animations may be provided at each of the slots and at the landing slot after the indicator has stopped, and such animations may be provide in audio format, to inform the players of the roulette game of the outcome of the roulette game.

The various embodiments described herein provide 3D graphical animation identifying outcome of the roulette game. The graphical animation includes providing payout for one or more slots in the roulette wheel giving a quick view of the possible outcomes so that the user may be able to use the possible outcomes to place accurate bets quickly during subsequent gameplay. In the embodiments where the graphical animation is presented in the form of information matrix, the information matrix provides a quick view of numbers that a user has recently bet on, most common numbers the user has bet on, numbers that have provided greatest payouts, numbers that have provided more frequent payouts, etc., to allow the user to make informed decisions during subsequent game play of the roulette game.

Embodiments are presented herein with reference to an online roulette game, but the same or similar principles can be extended to other kinds of online casino games including various types of betting games (such as skill games, trivia games, shooting games, fighting games, etc.). The principles presented herein, as can be seen, may be applied to any betting game or game of chance where the outcome of the game may be rendered to inform the users where or in what the users have placed their wagers/bets and the potential payouts. It should be noted that the principles of the present embodiments may also be extended to real-world casino games. A user viewing an augmented reality (AR) version of the real-world casino games may also be presented with similar animation at a display device used for viewing the AR version of the game. In fact, the principles of the present embodiments may also be extended to any type of application that requires user notification of the outcome.

The embodiments presented may be applied to real-life money gambling so long as their implementation, all or in part, follow the pertinent rules and regulations for real-money gambling. Further, in one embodiment, the random number generator follows the prescribed rules and regulations. In addition, for real-money gambling, certain features may be adjusted or modified to follow the prescribed rules and regulations.

It is noted that the embodiments presented herein may be implemented in any computing platform having a display. For example, the game may be played on a personal computer, a tablet, a smart phone, a mobile device, a slots machine, etc. In addition, the inputs for playing the game may be entered via keyboard, buttons, mouse, touch-screen interface, gestures, voice, etc. In addition, the embodiments presented herein may also be utilized for real-life games.

Figure 5:
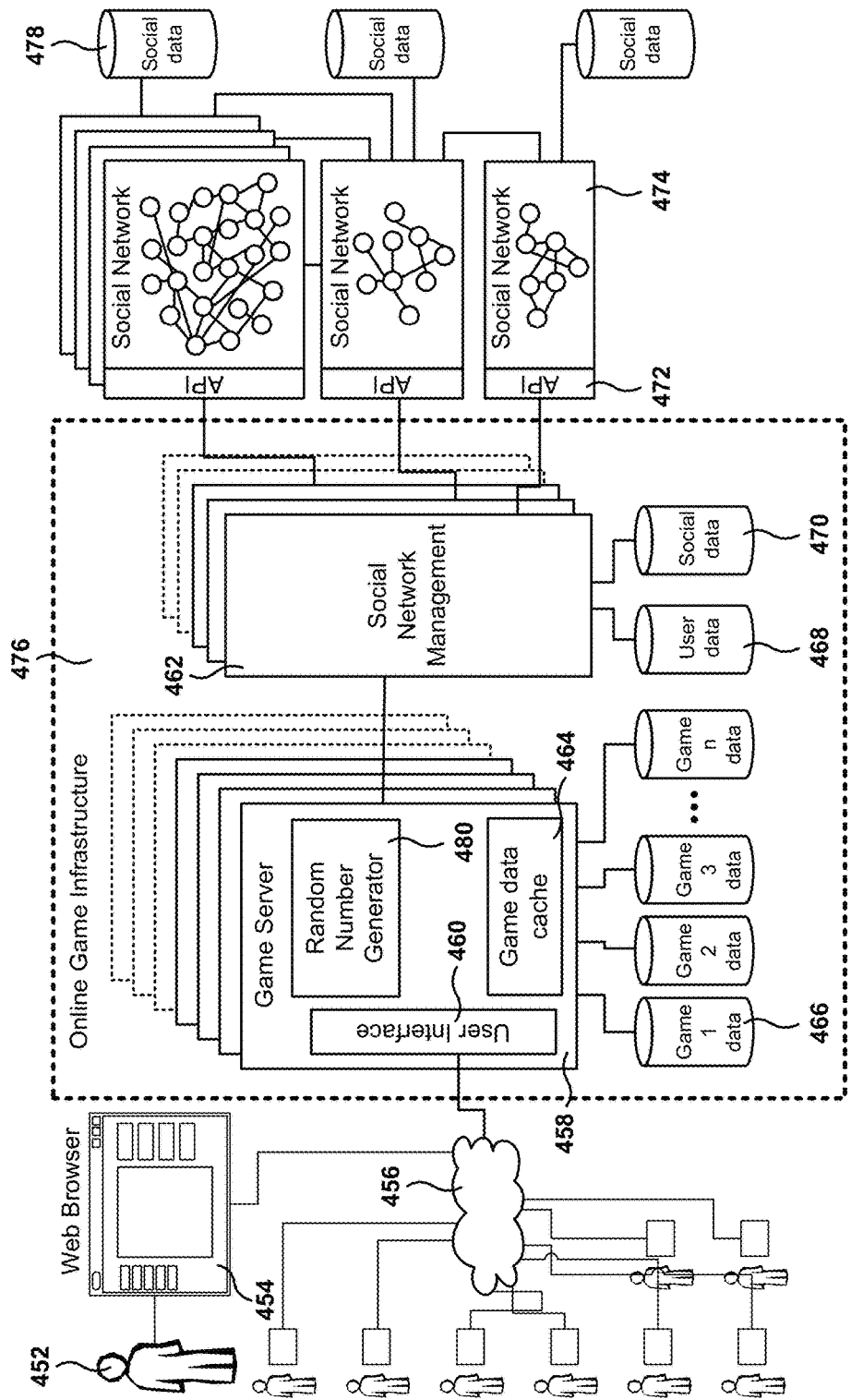
FIG. 5 illustrates an implementation of a Massively Multiplayer Online (MMO) infrastructure, according to one embodiment.

FIG. 5 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. The web browser 454 is provided on a client device, such as a lap top computing device, a desk top computing device, a mobile computing device, a table computing device, or any combinations thereof, and is used to interact with the web server, cloud server, etc. Network 456 interconnects players 452 with the one or more game servers 458.

Each game server 458 has access to one or more game databases 466 for keeping game data and random number generator 480. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 5 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 8 should therefore not be interpreted to be exclusive or limiting, but rather exemplary or illustrative.

Figure 6:
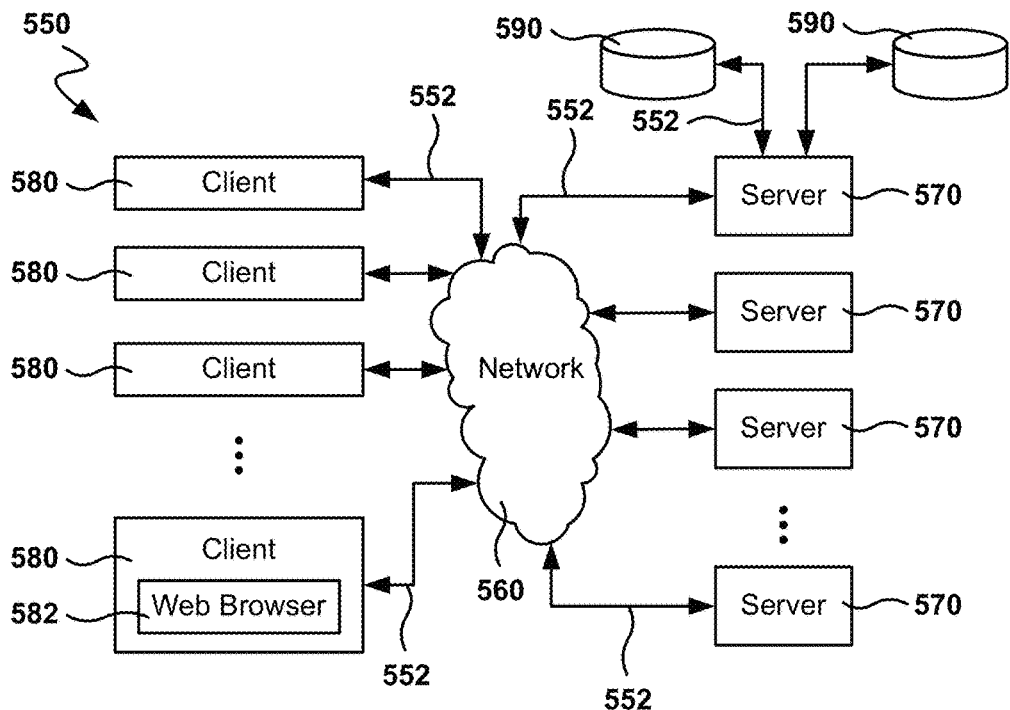
FIG. 6 illustrates an example network environment suitable for implementing embodiments.

FIG. 6 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 7:
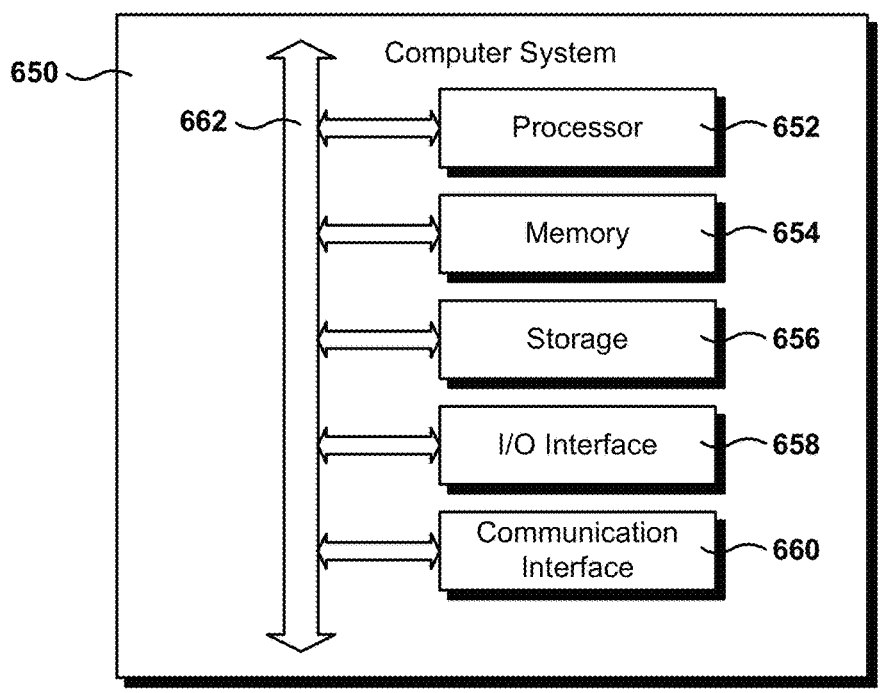
FIG. 7 illustrates an example computer system for implementing embodiments.

FIG. 7 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more program instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for providing animation for an online roulette game during game play, comprising:
   providing data for enabling an interface on a device used for playing the online roulette game, the interface rendering an image of a grid of bet entries and a roulette wheel on which a ball is provided for spinning, during the game play, to arrive at an outcome on the online roulette game, the roulette wheel having a plurality of slots with each of the plurality of slots corresponding to a number defined in the grid;
   identifying the number on the grid on which a bet has been placed during the game play;
   generating a number using a random number generator during the game play, the generated number used to define the outcome for the online roulette game, the generated number corresponds to a specific one of the plurality of slots in the roulette wheel in which the ball is to land; and
   providing graphical animation at the roulette wheel, wherein the graphical animation includes an animation of the ball spinning around the roulette wheel and a visual indication of the outcome rendered beside the specific slot in which the ball is to land as the ball approaches the specific one of the plurality of slots in the roulette wheel, the visual indication corresponds to a payout computed for the generated number,
   wherein operations of the method are performed by a processor.

2. The method of claim 1, wherein the animation further includes slowing motion of the ball as the ball approaches the specific one of the plurality of slots corresponding to the generated number.

3. The method of claim 2, wherein providing the graphical animation further includes providing sound effects at the roulette wheel, audio intensity provided by the sound effects increasing from a minimal setting as the ball spins around the roulette wheel to a maximum setting as the ball lands in the specific one of the plurality of slots.

4. The method of claim 1, further includes providing an animation of the roulette wheel spinning in a direction opposite to the direction of the ball spinning around the roulette wheel, the animation further includes slowing motion of the roulette wheel as the ball approaches the specific one of the plurality of slots corresponding to the generated number.

5. The method of claim 1, wherein the payout for each number defined on the grid is computed based on a bet amount and a bet entry selected.

6. The method of claim 5, wherein providing the graphical animation includes providing an animation at different slots in the roulette wheel as the ball passes the different slots toward the specific one of the plurality of slots defined by the generated number, the graphical animation presented at each of the different slots provide a visual indication of the computed payout for the number associated with each of the different slots.

7. The method of claim 6, wherein the visual indication is presented as a transparent stack of chips identifying the computed payout for each of the different slots.

8. The method of claim 1, wherein when there are no bets placed on any numbers in the grid, the graphical animation includes motion of the ball as the ball approaches the specific one of the plurality of slots defined by the generated number.

9. The method of claim 1, wherein the graphical animation provided at the specific one of the plurality of slots where the ball is to land defined by the generated number includes presenting one or more of highlighting the ball, highlighting the specific one of the plurality of slots in the roulette wheel where the ball is to land, providing a zoom-in view of the slot as the ball approaches the specific one of the plurality of slots, providing a matrix of previous wins and near misses, rendering one of flying stars, flying balloons, confetti on or around the specific one of the plurality of slots, or any combinations thereof.

10. A method for providing animation to an online roulette game during game play, comprising:
    providing data for enabling an interface on a device used for playing the online roulette game, the interface rendering an image of a grid identifying bet entries and a roulette wheel on which an indicator is provided to determine an outcome on the online roulette game, the roulette wheel having a plurality of slots with each of the plurality of slots corresponding to a number defined in the grid;
    identifying the number on the grid of the roulette game on which a bet has been placed during the game play;
    generating a number using a random generator during the game play, the generated number used to define the outcome for the online roulette game, the generated number corresponds to a specific number in the grid and identifies a specific one of the plurality of slots in the roulette wheel in which the indicator is to stop; and
    providing a graphical animation at the roulette wheel, wherein the graphical animation includes spinning the roulette wheel toward the specific one of the plurality of slots defined by the generated number where the indicator is to stop and a visual indication of payout computed for each of the plurality of slots in the roulette wheel rendered beside respective one of the plurality of slots as the roulette wheel passes the respective one of the plurality of slots toward the specific one of the plurality of slots,
    wherein operations of the method are performed by a processor.

11. The method of claim 10, wherein providing the graphical animation includes slowing motion of the roulette wheel as the indicator approaches the specific one of the plurality of slots in the roulette wheel corresponding to the generated number.

12. The method of claim 10, wherein providing the graphical animation further includes providing sound effects at the roulette wheel, an audio intensity provided by the sound effects increasing from a minimal setting as the roulette wheel spins around to a maximum setting as the indicator stops at the specific one of the plurality of slots.

13. The method of claim 10, wherein the payout is computed for each of the numbers on the grid based on a bet amount and a bet entry selected.

14. The method of claim 10, wherein the visual indication provided at each slot is presented as a transparent stack of chips that correlates with the payout computed for the specific one of the plurality of slots.

15. A non-transitory computer-readable storage medium storing a computer program with program instructions, which when executed by a processor provides a method for providing animation for an online roulette game during game play, the storage medium includes:
    program instructions for providing data for enabling an interface on a device used for playing the online roulette game, the interface rendering an image of a grid identifying bet entries and a roulette wheel on which a ball is provided for spinning, during the game play, to arrive at an outcome on the online roulette game, the roulette wheel having a plurality of slots with each of the plurality of slots corresponding to a number defined in the grid;
    program instructions for identifying the number on the grid on which a bet has been placed during the game play;
    program instructions for generating a number using a random number generator during the game play, the generated number used to define the outcome for the online roulette game, the generated number corresponds to a specific number in the roulette wheel in which the ball is to land; and
    program instructions for providing graphical animation at the roulette wheel, wherein the graphical animation includes an animation of the ball spinning around the roulette wheel and a visual indication of the outcome rendered beside the specific slot in which the ball is to land as the ball approaches the specific one of the plurality of slots in the roulette wheel, the visual indication corresponds to a payout computed for the generated number.

16. The storage medium of claim 15, wherein the program instructions for providing the graphical animation at the roulette wheel includes program instructions for slowing motion of the ball as the ball progresses around the roulette wheel toward the specific one of the plurality of slots defined by the generated number.

* * * * *